Dec. 6, 1955  A. I. APPLETON  2,726,372
SWIVEL MOUNTING FOR ELECTRICAL DEVICES
Filed June 3, 1950
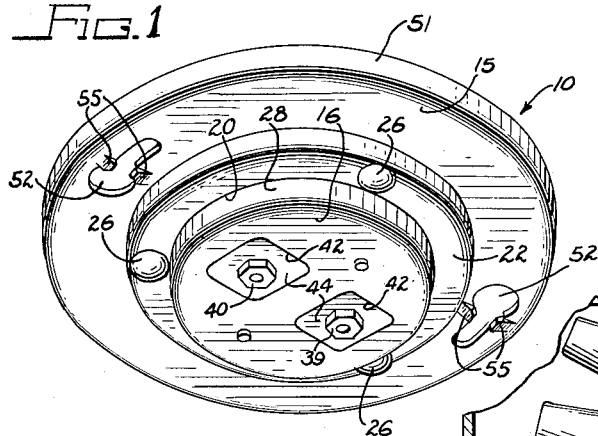
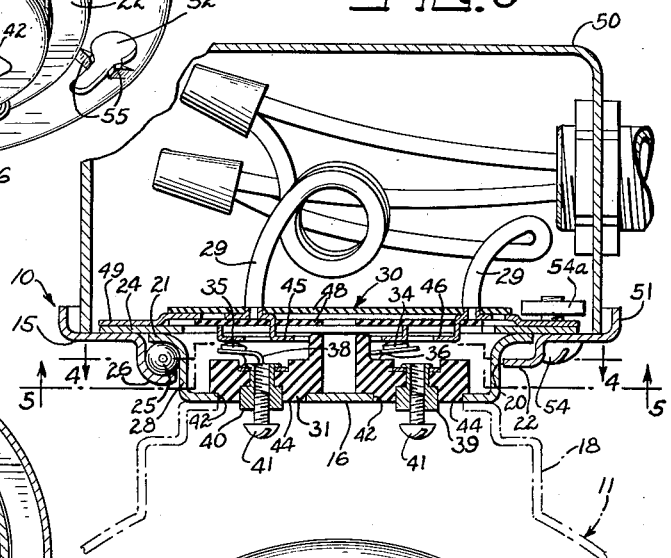
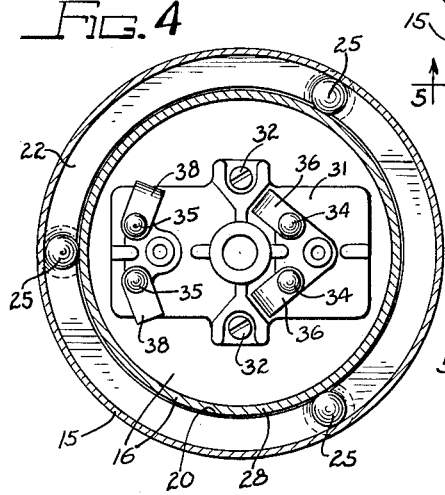
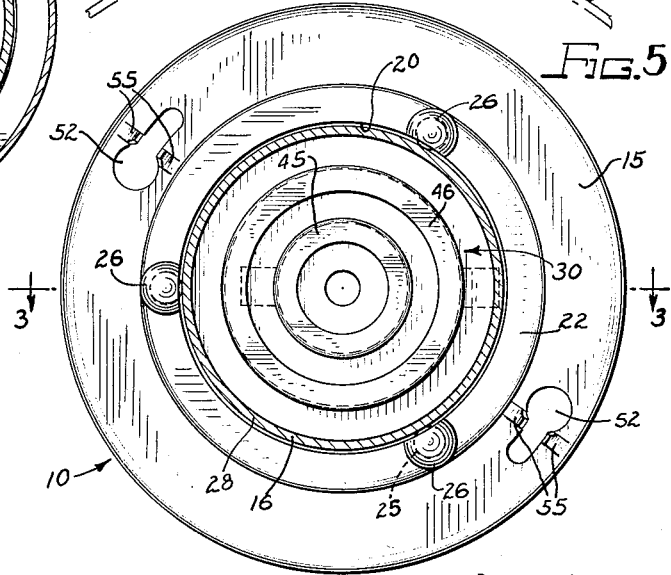
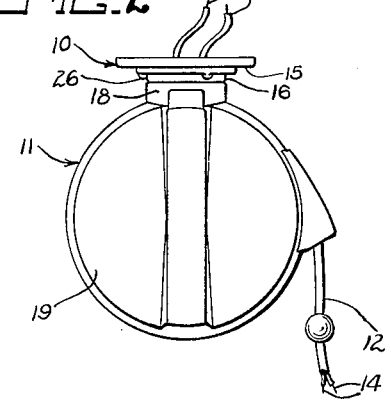
Inventor
Arthur I. Appleton
by: Carlson, Pitzner, Hubbard & Wolfe
attys.

United States Patent Office 2,726,372
Patented Dec. 6, 1955

2,726,372

SWIVEL MOUNTING FOR ELECTRICAL DEVICES

Arthur I. Appleton, Northbrook, Ill.

Application June 3, 1950, Serial No. 165,916

2 Claims. (Cl. 339—8)

The present invention pertains generally to a swivel support for various electrical devices and appliances but more specifically to a novel swivel mounting of particular though not exclusive utility in connection with the mounting of take-up reels for flexible electrical conductors.

One object of the invention is to provide a novel swivel mounting of the character set forth and which can be readily and securely attached in the vicinity of a power supply outlet.

Another object is to provide a swivel mounting of the above type and having a novel correlation between its mechanical and its electrical components.

A further object is to provide a swivel mounting embodying simple and well protected means for connecting the swivel mounted device to a source of power.

Still another object is to provide a novel swivel mounting of the character set forth and which will be susceptible of incorporation as a component part of a take-up reel assembly for electric cord. A take-up reel assembly of this type is disclosed in a copending companion application of Irwin Meyer, Serial No. 165,953, filed June 3, 1950.

Further objects and advantages will become apparent as the following description proceeds, taken in the light of the accompanying drawings, wherein:

Figure 1 is a perspective view of an illustrative swivel mounting embodying the present invention.

Fig. 2 is a side view of the illustrative device shown in Fig. 1 but incorporated as a component part of a take-up reel assembly.

Fig. 3 is an enlarged fragmentary vertical sectional view showing the illustrative swivel mounting secured in place upon an electrical outlet box, such view being taken in the plane of the line 3—3 as indicated in Fig. 5.

Fig. 4 is a transverse sectional view taken through the swivel mounting in the plane of the line 4—4 in Fig. 3 and showing certain ones of the slidable contact members.

Fig. 5 is a transverse sectional view through the illustrative mounting but taken in the plane of the line 5—5 in Fig. 3, such view showing certain other ones of the sliding contact members.

While the invention is susceptible of various modifications and alternative constructions, a preferred embodiment has been shown in the drawings and will be described below in considerable detail. It should be understood, however, that there is no intention to limit the invention to the specific form disclosed, but on the contrary, the intention is to cover all modifications and alternative constructions falling within the spirit and scope of the invention as expressed in the appended claims.

Referring to Figs. 1 and 2, there is shown an illustrative swivel mounting 10 embodying the present invention and adapted in the present instance to support a take-up reel assembly 11 for electric cord. The reel assembly 11 has wound thereon a length of flexible electrical cord 12 containing one or more insulated conductors 14. The mounting 10 comprises a supporting flange 15 together with an attached swivel plate 16 relatively rotatable with respect thereto. As the drawing indicates, the illustrative mounting 10 is integrated into the reel assembly 11 as by means of a transition neck 18 attached both to the swivel plate 16 a housing 19 within which the reel assembly is encased.

Provision is made for giving the swivel plate 16 complete freedom of swivel movement within the mounting 10, permitting bodily rotation of the plate 16 together with the device or appliance supported thereby through 360° or more in either direction. This is accomplished in the present instance by forming the supporting flange 15 in dished configuration with a central aperture 20 of appropriate size to receive the swivel plate 16 without binding. The swivel plate in the present instance is also dished and fashioned with an integral annular thrust collar 21 which overlaps a stepped annular offset or collar 22 fixed to and preferably integral with the supporting plate 15. The thrust collar 21 of the swivel plate 16 is confined within the annular space defined by the offset 22 as by means of an overlying keeper plate 24 fixed to the inside of the supporting flange 15 in any convenient manner.

Interposed between the swivel plate 16 and the surrounding offset 22 is an appropriate means for reducing frictional contact between these parts. This is accomplished in the present instance by the use of a plurality of hardened metal balls 25 loosely confined and rotatable within pockets defined by circumferentially spaced bulbous portions 26 struck out of the annular offset 22 (see Figs. 1, 3 and 4). The balls 25 are appropriately spaced so as to bear against a cylindrical portion 28 of the supporting plate, centering the same within the aperture 20 and thereby minimizing frictional contact between the offset 22 and the plate 16. The balls 25, in addition, withstand any force urging the thrust collar 21 against the offset 22, again reducing frictional contact between the collar 21 and offset 22.

In order to provide electrical continuity between conductors 29 fixed to the stationary supporting flange 15 and the conductors of the electrical device or appliance swivelly supported therefrom, a slidable contact means is interposed between the swivel plate 16 and the supporting flange 15. In the illustrative device 10, such means comprises a slip ring and sliding contact assembly 30 (Figs. 3 to 5, inclusive) which happens to be of the two-conductor type and connects the conductors 29 with conductors 14 of the take-up reel cord 12. Accordingly, there is defined within the interior of the supporting plate 16 a large recess which nestingly receives a terminal block 31 rigidly fixed to the plate 16 as by means of screws 32. The block 31 in this instance has mounted thereon two spaced-apart sets of resilient contacts 34 and 35. These are respectively mounted adjacent the free ends of reversely bent prongs 36, 38 which are secured to the block as by means of terminal elements 39, 40. Such elements may, in turn, be connected to suitable leads from the sliding contact mechanism of the reel assembly 11 as by means of screws 41. To avoid short circuiting between the terminals 39 and 40, the swivel plate 16 is fashioned with insulating apertures 42 which receive relatively flat insulating bosses 44 (Figs. 1 and 3) integral with the terminal block 31.

Operatively associated with the contacts 34, 35 and fixed with respect to the supporting flange 15 is a pair of slip rings 45, 46. The latter in this instance are insulated from each other and maintained in spaced relation by means of a pair of closely spaced insulating panels 48 fixed to a backing plate 49. The latter may be secured to the supporting flange 15 in overlying relation with the keeper plate 24 in any convenient manner. Each of the slip rings has one or more outturned lugs sandwiched between the plates 48, certain of such lugs being extended and electrically connected to the conductors 29.

In the construction described above, there has been provided a novel correlation between the slidable contact means and the mechanical elements of the swivel mechanism. By reason of such correlation, the resilient contact prongs 36, 38 act as a thrust-producing means. By proper tensioning of their resiliency, the arms 36 are adapted to create the necessary amount of frictional bias between the thrust collar 21 and the mounting balls 25 carried by the offset 22 so that the swivel plate and the device attached thereto may be rotated with ease but self-maintaining in any desired angular position to which it might previously have been rotated. Such resilient thrust action also insures that the swivel mounting 10 will maintain such characteristic regardless of the bodily position in which it might be oriented.

Means is provided for rendering the swivel mounting 10 susceptible of anchoring upon an electrical outlet box with the supporting flange 15 serving as a cover for the box. This is achieved by forming the outer edge of the flange 15 in the same general shape as the outlet box with which it might be used and by including provision for attaching such flange to the box. Referring once more to Fig. 3, there is shown an outlet box 50 of generally circular shape and having secured thereto the swivel mounting 10. In this instance, the supporting flange 15 is also of circular shape, being fashioned with a peripheral skirt 51 of slightly greater diameter than the box and comparable to the customary skirt provided on conventional box covers. To permit attachment of the flange 15 to the box, the former is fashioned with a pair of diametrically opposed keyhole slots 52. Each of the slots has a large end for receiving the head of a mounting screw 54 projecting out of the box, and a smaller or segmental end which can be slid into engagement with the screw shank by rotation of the flange 15 through a relatively small angle. In the latter position, the head of the mounting screw overlies the marginal portions of the slot and locks the flange 15 in place when tightened thereagainst. Each of the mounting screws 54 is supported by a lug 54a fixed within the box as shown in Fig. 3. To preclude accidental disengagement of the supporting flange 15 due, for example, to reaction resulting from swivelling of the device attached to the plate 16, suitable abutment means is interposed between the circumferential extremities of each of the slots 52. In the present instance, such means comprises a pair of upstruck safety lugs 55 which are adapted to engage the head of each screw 54 and preclude angular movement of the flange 15 relative to the outlet box 50. Angular movement is of course permitted by these lugs after the screws have been deliberately loosened by a considerable amount.

In the light of the foregoing, it will be appreciated by those skilled in the art that the swivel mounting 10 described herein possesses numerous important commercial advantages. In general, it eliminates the need for mechanical separation between a swivel mechanism and its power supply connections, rendering the use of external jumpers and the like entirely unnecessary. It produces this result without any sacrifice of strength, and in fact, is equally strong if not considerably stronger than many conventional swivel mountings used for electrical appliances.

The mechanism 10 is especially advantageous as a mounting for take-up reel assemblies for electrical cord. It makes possible the mounting of such a reel in any location where there is an electrical outlet box and takes advantage of the usually rugged mountings of such boxes to provide an anchorage which is certain to have adequate strength. The free swivel movement, characteristic of the mechanism 10, is ingeniously combined with the controlled frictional bias arrangement so that the reel may be swiveled without difficulty to any desired angular position which will give a good fair-lead for the direction in which the cord 12 extends, and ordinary tension on the cord 12 will not deflect it from such position.

Over and above the foregoing, the safety feature provided in the mounting flange 15 insures the user against accidental disengagement of such flange and enables the reel to be installed in overhead locations without the fear of dislodgment.

I claim as my invention:

1. A swivel mounting for use in rotatably supporting electrical equipment, said mounting comprising a dished outlet box cover having a central aperture bordered by radial and axial wall portions, said radial wall portion having spaced apart pockets defined therein, a dished swivel plate having a marginal radial thrust collar and an axially extending portion, said swivel plate being rotatably nested in said cover with its thrust collar in spaced parallel relation to said radial wall portion and its axially extending portion in spaced parallel relation to said axial wall portion and projecting through said aperture, a plurality of centering balls interposed between said spaced thrust collar and radial wall portion and between said spaced axially extending portion and axial wall portion, said balls being situated in the pockets of said radial wall portion, means on the projecting portion of said swivel plate for rigid attachment of the equipment to be supported, and slidable, resilient contact means interposed between said cover and swivel plate, the resiliency of said contact means serving to bias said thrust collar into firm abutment with said balls.

2. A rotatable swivel support for use with a take-up reel for flexible electric cord, said support comprising, in combination, a dished outlet box cover having a central aperture bordered by a radial collar and an axial wall portion, a dished swivel plate having a marginal radial thrust collar and an axially extending portion, said swivel plate being rotatably nested in said cover with its thrust collar in spaced parallel relation to said radial collar and its axially extending portion in spaced relation to said axial wall portion and projecting through said aperture, a plurality of centering balls interposed between said spaced thrust collar and said radial collar and between said spaced axially extending portion and axial wall portion, one of said collars having pockets wherein said balls are situated, means on the projecting portion of said swivel plate for rigid attachment of the reel to be supported, and slidable, resilient contact means interposed between said cover and swivel plate, the resiliency of said contact means serving to bias said thrust collar into firm abutment with said balls.

References Cited in the file of this patent

UNITED STATES PATENTS

| | | |
|---|---|---|
| 1,214,031 | Heim | Jan. 30, 1917 |
| 1,268,102 | Drumm | June 4, 1918 |
| 1,277,582 | Heim | Sept. 3, 1918 |
| 1,305,842 | Toney | June 3, 1919 |
| 1,501,029 | Sargeant | July 8, 1924 |
| 1,520,308 | Quadri | Dec. 23, 1924 |
| 1,639,125 | Benjamin | Aug. 16, 1927 |
| 1,663,570 | Senz | Mar. 27, 1928 |
| 2,019,989 | Merkel | Nov. 5, 1935 |
| 2,074,305 | Tornblom | Mar. 16, 1937 |
| 2,248,759 | Hollander | July 8, 1941 |
| 2,395,899 | Morrow et al. | Mar. 5, 1946 |
| 2,450,257 | Simmons | Sept. 28, 1948 |
| 2,477,901 | Robboy | Aug. 2, 1949 |

FOREIGN PATENTS

| | | |
|---|---|---|
| 551,958 | France | Jan. 16, 1923 |